(12) United States Patent
Conaughty et al.

(10) Patent No.: US 9,261,237 B2
(45) Date of Patent: Feb. 16, 2016

(54) KEYWAY RETENTION SYSTEM FOR CRYOGENIC STORAGE TANKS

(71) Applicant: Lockheed Martin Corporation, Bethesda, MD (US)

(72) Inventors: Keith S. Conaughty, Rockledge, FL (US); Jonathan David Artman, Palm Bay, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 14/610,398

(22) Filed: Jan. 30, 2015

(65) Prior Publication Data

US 2015/0211681 A1 Jul. 30, 2015

Related U.S. Application Data

(60) Provisional application No. 61/933,808, filed on Jan. 30, 2014.

(51) Int. Cl.
*F17C 13/04* (2006.01)
*F17C 1/12* (2006.01)
*F17C 13/00* (2006.01)

(52) U.S. Cl.
CPC ............... *F17C 1/12* (2013.01); *F17C 13/001* (2013.01); *F17C 2203/014* (2013.01); *F17C 2203/015* (2013.01); *Y10T 29/49359* (2015.01)

(58) Field of Classification Search
CPC .... F17C 1/12; F17C 13/001; F17C 2203/014; F17C 2203/015; F17C 2203/016; F17C 2203/017
USPC ............................. 220/560.11, 560.1, 560.06
See application file for complete search history.

(56) References Cited

U.S. PATENT DOCUMENTS

| | | | | |
|---|---|---|---|---|
| 3,319,431 | A * | 5/1967 | Clarke et al. | 62/53.2 |
| 4,184,609 | A * | 1/1980 | Vorreiter | 220/560.1 |
| 6,971,537 | B2 * | 12/2005 | Enright, Jr. | F17C 13/081 220/560.08 |
| 7,878,526 | B1 * | 2/2011 | Jantzen | 280/515 |
| 2012/0009058 | A1 * | 1/2012 | Floyd et al. | 415/213.1 |

* cited by examiner

*Primary Examiner* — Stephen Castellano
(74) *Attorney, Agent, or Firm* — Marsh Fischmann & Breyfogle LLP

(57) ABSTRACT

A cryogenic tank support assembly and method are provided. In one embodiment, a cryogenic tank support assembly includes an outer tank structure, an inner tank structure having a storage volume therein for storing a cryogenic material, one or more keys on an outer side of the inner tank structure, and one or more key blocks comprised of a thermally insulating material and affixed to an inner side of the outer tank structure to define one or more keyways. Each of the one or more keys may be configured to be received in a corresponding one of the one or more keyways. When the key(s) is/are received in the keyway(s), the key block(s) contact the key(s) to support the inner tank structure in a spaced relation with the outer tank structure such that the inner tank structure does not directly contact the outer tank structure.

18 Claims, 13 Drawing Sheets

KEYWAY RETENTION SYSTEM FOR CRYOGENIC STORAGE TANKS

RELATED APPLICATION INFORMATION

This application claims priority from U.S. Provisional Application Ser. No. 61/933,808, entitled "KEYWAY RETENTION SYSTEM FOR CRYOGENIC STORAGE TANKS", and filed Jan. 30, 2014. The entirety of this application is incorporated herein by reference.

FIELD OF THE INVENTION

The present invention relates generally to storage tanks, and more particularly to providing static and dynamic support along with thermal isolation of a cryogenic storage tank.

BACKGROUND OF THE INVENTION

Cryogenic storage tanks may be used to store liquid natural gas (LNG) or other cryogenic substances for transportation between one location (e.g., an LNG production facility) and another location (e.g., a natural gas distribution facility or power plant). Cryogenic storage tanks may also be used to store LNG at a storage facility for an indeterminate period. Cryogenic storage tanks may additionally be used onboard vehicles (e.g., ships, trains, buses, tractor-trailers, and automobiles) as a source of natural gas that may be used to power such vehicles or systems onboard such vehicles. Regardless of their application, cryogenic storage tanks need to be both durable and efficient. For this reason, many cryogenic storage tanks employ a double wall (tank within a tank) construction. The inner tank must be supported within the outer tank in a manner that significantly reduces or prevents movement of the inner tank. However, fixing the inner tank in position within the outer tank presents issues, particularly where the manner by which the inner tank is held in position provides pathways by which thermal energy may be readily conducted between the inner and outer tanks. For example, simply welding metallic struts between the inner and outer tanks provides pathways that readily transfer thermal energy between the inner and outer tanks.

SUMMARY OF THE INVENTION

Accordingly, a cryogenic tank support assembly and method is provided. The cryogenic tank support assembly and method are particularly suited for supporting horizontal cryogenic tanks for the marine industry. The support assembly securely captures a cryogenic tank and can resist motion in all directions simultaneously while allowing for thermal dimensional changes. A reduced version of the support assembly can also be used in fixed or land based cryogenic tanks where resistance of extreme loading is not required. Additionally, modified designs can also be used in vertical cryogenic tank applications. A scaled down version may also be used for smaller iso-container sized cryogenic tanks.

In one aspect, a cryogenic tank support assembly may include an outer tank structure, an inner tank structure having a storage volume therein for storing a cryogenic material, one or more keys on an outer side of the inner tank structure, and one or more key blocks comprised of a thermally insulating material and affixed to an inner side of the outer tank structure to define one or more keyways in which the one or more keys are received. In this regard, each key block comprised of thermally isolating material contacts the key received in the keyway defined by the block to support the inner tank structure in a spaced relation with the outer tank structure such that the inner tank structure does not directly contact the outer tank structure.

In another aspect, a method of supporting a cryogenic storage tank in a thermally isolated manner may include providing one or more keys on an outer side of an inner tank structure having a storage volume therein for storing a cryogenic material. The method may also include providing one or more keyways on an inner side of an outer tank structure with the one or more keyways being comprised of a thermally insulating material affixed to the inner side of the outer tank structure. The method may also include positioning the inner tank structure within the outer tank structure with each of the one or more keys being received in a corresponding one of the one or more keyways such that the thermally insulating material of the one or more keyways contacts the one or more keys to support the inner tank structure in a spaced relation with the outer tank structure wherein the inner tank structure does not directly contact the outer tank structure.

Accordingly, the cryogenic tank weight is supported by a key and keyway assembly that may be comprised of a thermally insulating material. In one example, the thermally insulating material may comprise a fiberglass epoxy material such as, for example, the cryogenically acceptable National Electrical Manufacturers Association (NEMA) G10CR material. The G10CR key is the only contacting surface to the cryogenic vessel. In one embodiment, the primary weight is carried by one or more horizontal G10CR blocks at the three and nine o'clock positions, and all lateral loads are reacted using additional G10CR blocks located at the six and twelve o'clock positions. Axial loads acting on the tank may be reacted using shear pins and shim packs to lock one end of the tank in place.

The cryogenic storage tank support assembly and method provide various advantages. For example, the assembly and method not only resolve the loading requirements but also thermally isolate the inner tank. This solution provides a captive locking mechanism that enables integration of an inner tank into an outer tank during production. In this regard, the total assembly is a double walled tank where an inner tank may be integrated into an outer tank shell, captured and locked into position.

Various refinements exist of the features noted in relation to the various aspects of the present invention. Further features may also be incorporated in the various aspects of the present invention. These refinements and additional features may exist individually or in any combination, and various features of the various aspects may be combined. These and other aspects and advantages of the present invention will be apparent upon review of the following Detailed Description when taken in conjunction with the accompanying figures.

DESCRIPTION OF THE DRAWINGS

For a more complete understanding of the present invention and further advantages thereof, reference is now made to the following Detailed Description, taken in conjunction with the drawings, in which.

DETAILED DESCRIPTION

Figure 1:
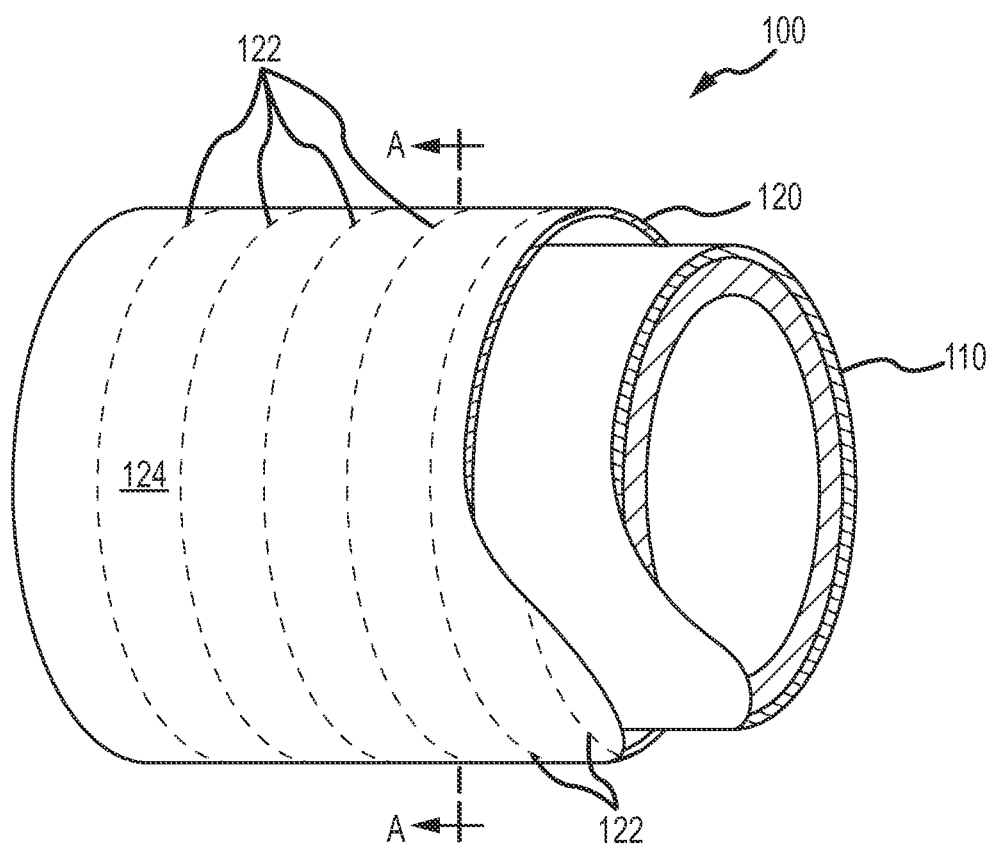
FIG. 1 is a perspective partial cutaway view of one embodiment of a cryogenic tank including a cryogenic tank support assembly.
Figure 2:
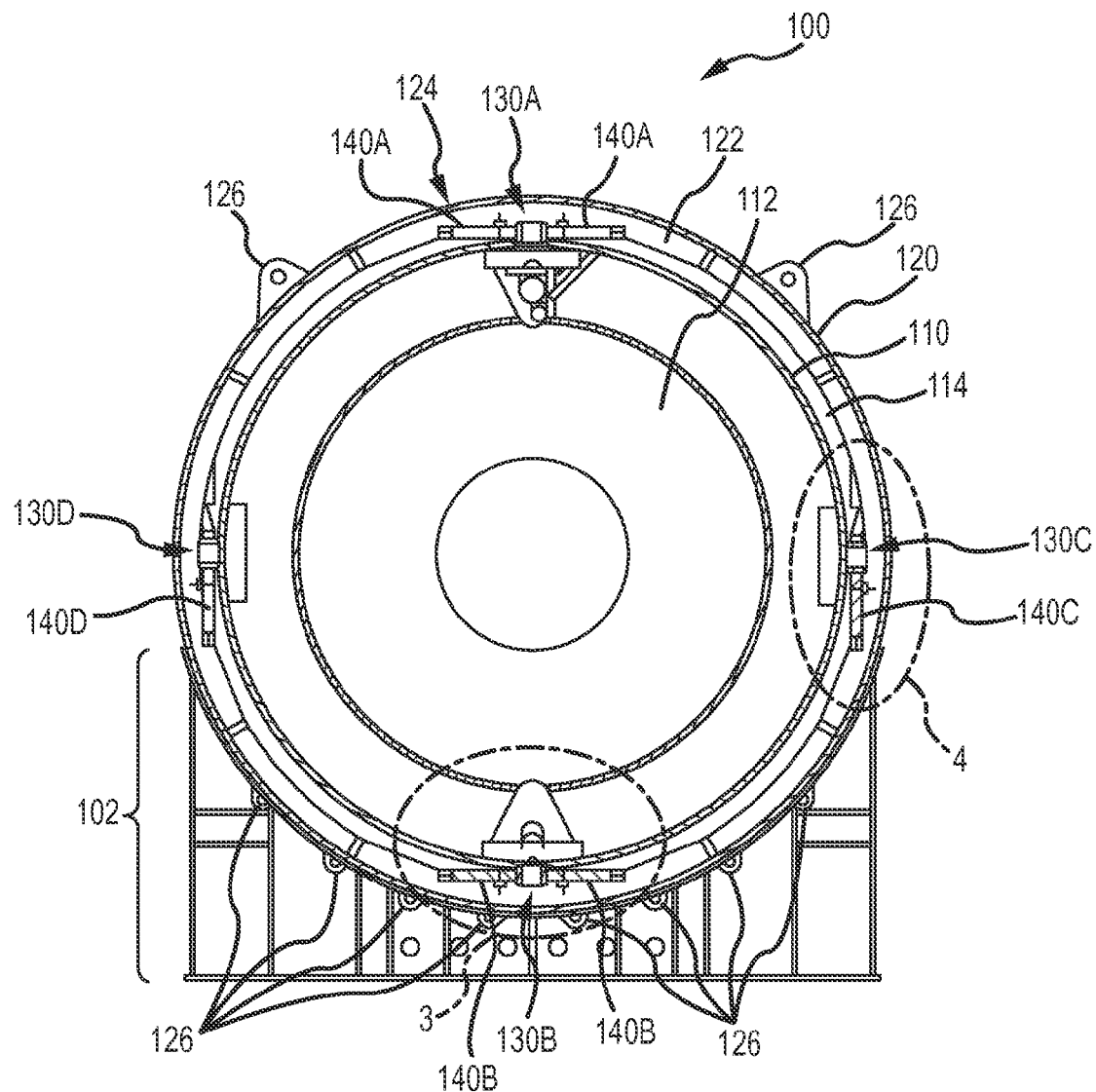
FIG. 2 is a cross sectional view of one embodiment of the cryogenic tank taken along line A-A in FIG. 1.

As illustrated in FIGS. 1 and 2, a cryogenic tank assembly 100 may include an inner tank structure 110 that defines a cryogenic storage space volume 112 within which a cryogenic substance may be disposed for storage and subsequent dispensing. In this regard, the inner tank structure 110 may include a valve (not shown) that permits the introduction of the cryogenic substance into the cryogenic storage space volume 112 and release of the cryogenic substance from the cryogenic storage space volume 112. Examples of cryogenic materials that may be disposed within the cryogenic storage space volume 112 of the inner tank structure 110 include, without limitation, liquid gases (e.g. hydrogen, oxygen, nitrogen), liquefied hydrocarbons (e.g., liquefied natural gas or LNG), and other substances that need to be maintained at low temperatures.

The inner tank structure 110 is surrounded by an outer tank structure 120. In this regard, the outer tank structure 120 totally surrounds the inner tank structure 110. An opening (not shown) may be provided through the outer tank structure 120 for accessing the valve of the inner tank structure 110. In the illustrated embodiment, the inner and outer tank structures 110, 120 are cylindrically shaped with the outer tank structure having a greater diameter than a diameter of the inner tank structure 110 such that a space 114 is provided between an outer surface of the inner tank structure 110 and an inner surface of the outer tank structure 120. In other embodiments, the outer and inner tank structures 110, 120 may be shaped in other manners as long as space is provided between an outer surface of the inner tank structure 110 and an inner surface of the outer tank structure 120. Such spacing is desirable in order to thermally isolate the inner tank structure 110 from the outer tank structure 120. In this regard, the space 114 between the inner and outer tank structures 110, 120 may be evacuated.

The outer tank structure 120 may be defined by a plurality of circumferential rib members 122 that are disposed adjacent to one another with a gap 123 between adjacent circumferential rib members 122. A skin 124 (e.g., one or more sheets of metal) may be affixed on the outside of the circumferential rib members 122. One or more lift and/or tie-down points 126 may be provided on the outside of the outer tank structure 120. One or more of the tie down points 126 may be utilized to secure the cryogenic tank assembly 100 to a support cradle structure 102 (e.g., using bolts or high strength pins).

The cryogenic tank assembly 110 also includes a plurality of keys 130A-130D provided on an outer side of the inner tank structure 110 and a plurality of key blocks 140A-140D affixed to the inner side of the outer tank structure 120 to define a plurality of correspondingly configured keyways. Each respective key 130A-130D is receivable in one of the keyways defined by the key blocks 140A-140D, and when received therein maintains the inner tank structure 110 in a spaced relation with the outer tank structure 120. In this regard, when the keys 130A-130D are received in the keyways defined by the key blocks 140A-140D, the key blocks 140A-140D provide the only points of contact with the inner tank structure 110. Although FIG. 2 shows four pairs of keys and key blocks 130A-130D, 140A-140D, in other embodiments, there may be fewer or more than four pairs of corresponding keys and key blocks 130A-130D, 140A-140D.

Each key block 140A-140D may be comprised of a thermally insulating material in order to thermally isolate the inner tank structure 110 by substantially reducing or eliminating thermal conduction between the inner and outer tank structures 110, 120 via the key blocks 140A-140D. In this regard, each key block 140A-140D may be comprised of a material having a relatively low coefficient of thermal conductivity (e.g., about 0.35 BTU/HR-FT-° F. or less). In one embodiment the key blocks 140 may comprise a fiberglass epoxy material such as, for example, G10CR.

The keys 130A-130D may be arranged on the outer side of the inner tank structure 120 such that they are located at various different radial locations around the inner tank structure 110. For example, where there are four keys 130A-130D, there may be keys 130A-130D located at three o'clock, six o'clock, nine o'clock and twelve o'clock radial locations. The key 130A located at the twelve o'clock radial location may be referred to herein as the top key 130A. The key 130B located at the six o'clock radial location may be referred to herein as the bottom key 130B. The keys 130C, 130D located at the three o'clock and nine o'clock locations may be referred to herein as the side keys 130C, 130D.

The top and bottom keys 130A, 130B may be configured in a similar manner, and the two side keys 130C, 130D may be configured in a similar manner. The keys 130A-130D may, for example, comprise metal pieces having a greater length than width that are welded to the inner tank structure 110.

Figure 3:
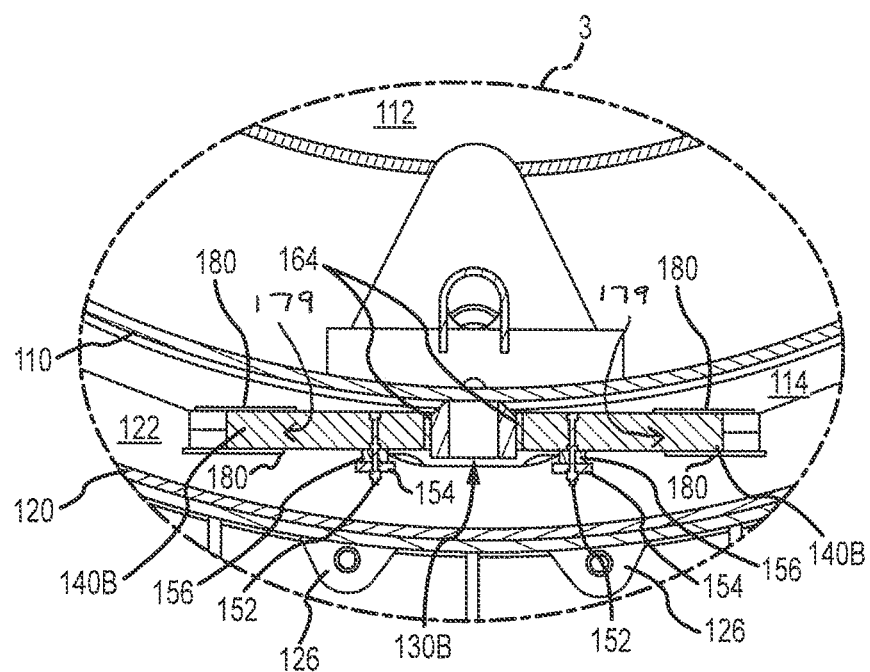
FIG. 3 is an enlarged view of a portion of the cryogenic tank taken at detail circle 3 in FIG. 2.
Figure 5:
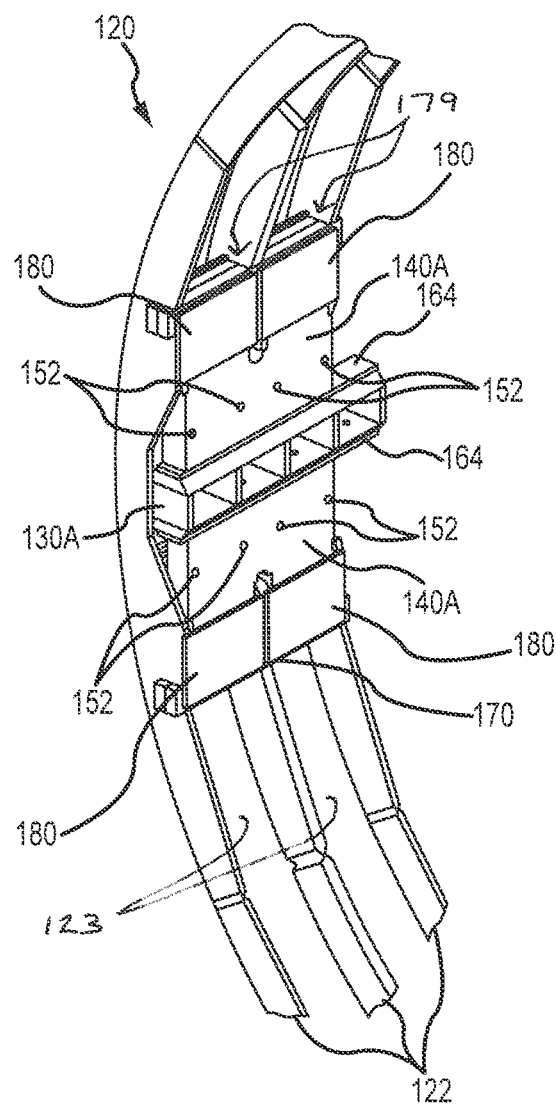
FIG. 5 is a perspective view of a portion of one embodiment of a cryogenic tank support assembly with a sliding top keyway.
Figure 6:
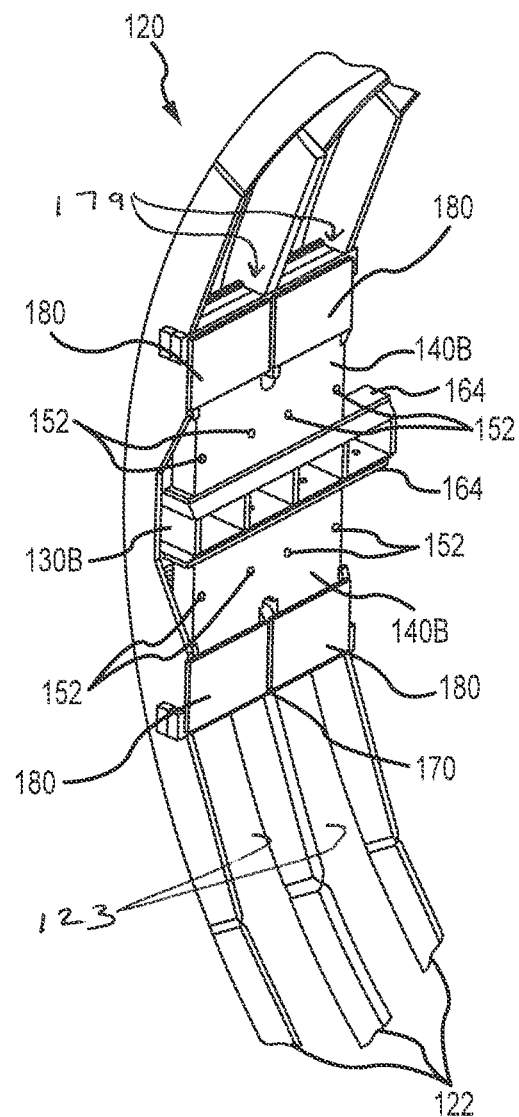
FIG. 6 is a perspective view of a portion of one embodiment of a cryogenic tank support assembly with a sliding bottom keyway.

As shown in FIGS. 3, 5 and 6, the keyways that receive the top and bottom keys 130A, 130B may be provided by affixing key blocks 140A, 140B to the inner side of the of the outer tank structure 120. In one arrangement, the key blocks 140A, 140B may be at least partially positioned within at least one gap 123 between adjacent circumferential rib members 122. For instance, the key blocks 140A, 140B may be at least partially positioned within adjacent gaps 123. A pair of the rectangular key blocks 140A may be affixed to the inner side of the outer tank structure 120 with a gap between edges of the key blocks 140A defining the top keyway at the twelve o'clock position for receiving top key 130A, and another pair of the rectangular key blocks 140B may be affixed to the inner side of the outer tank structure 120 with a gap between edges of the key blocks 140B defining the bottom keyway at the six o'clock position for receiving bottom key 130B. Each rectangular key block 140A, 140B may be affixed to the inner side of the outer tank structure 120 with one or more bolts 152 secured with nuts 154 to one or more thermal spacers 156 provided on the inner side of the outer tank structure 120. Additionally, the key blocks 140A-140D may extend into pockets 179 provided between plates 180 that extend between adjacent circumferential rib members 122. As shown, the pockets 179 may be positioned within the gaps 123.

Figure 4:
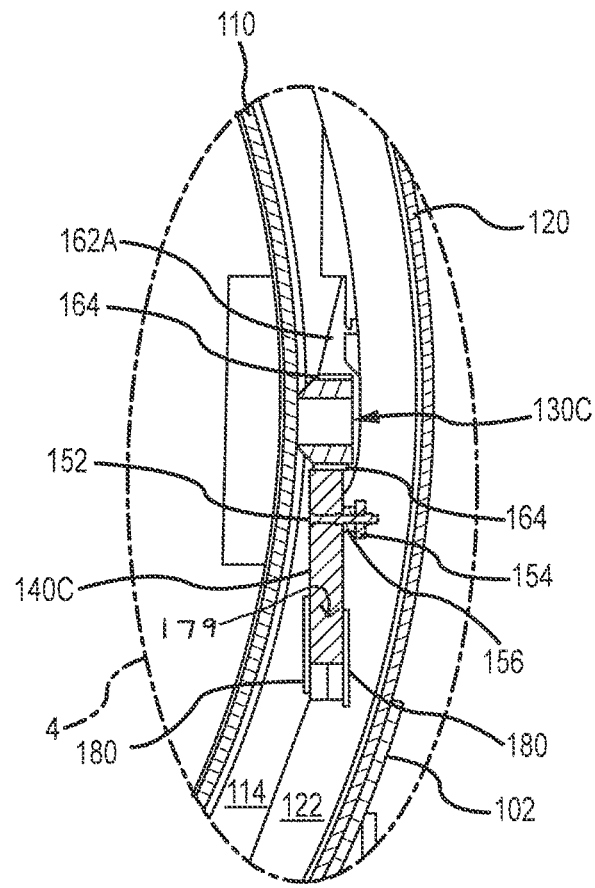
FIG. 4 is an enlarged view of a portion of the cryogenic tank taken at detail circle 4 in FIG. 2.
Figure 7:
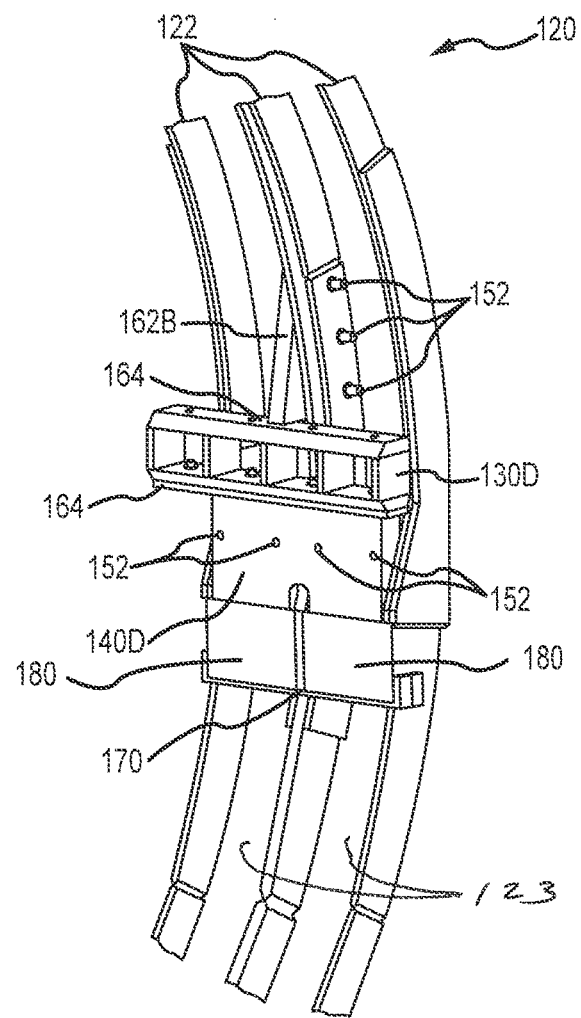
FIG. 7 is a perspective view of a portion of one embodiment of a cryogenic tank support assembly with a sliding left side keyway.
Figure 8:
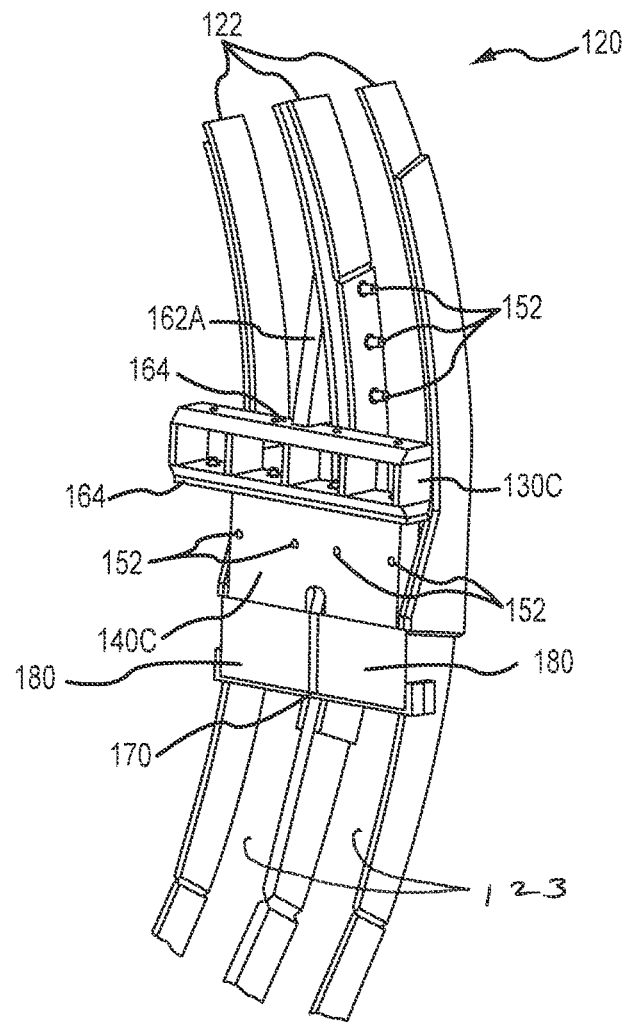
FIG. 8 is a perspective view of a portion of one embodiment of a cryogenic tank support assembly with a sliding right side keyway.
Figure 9:
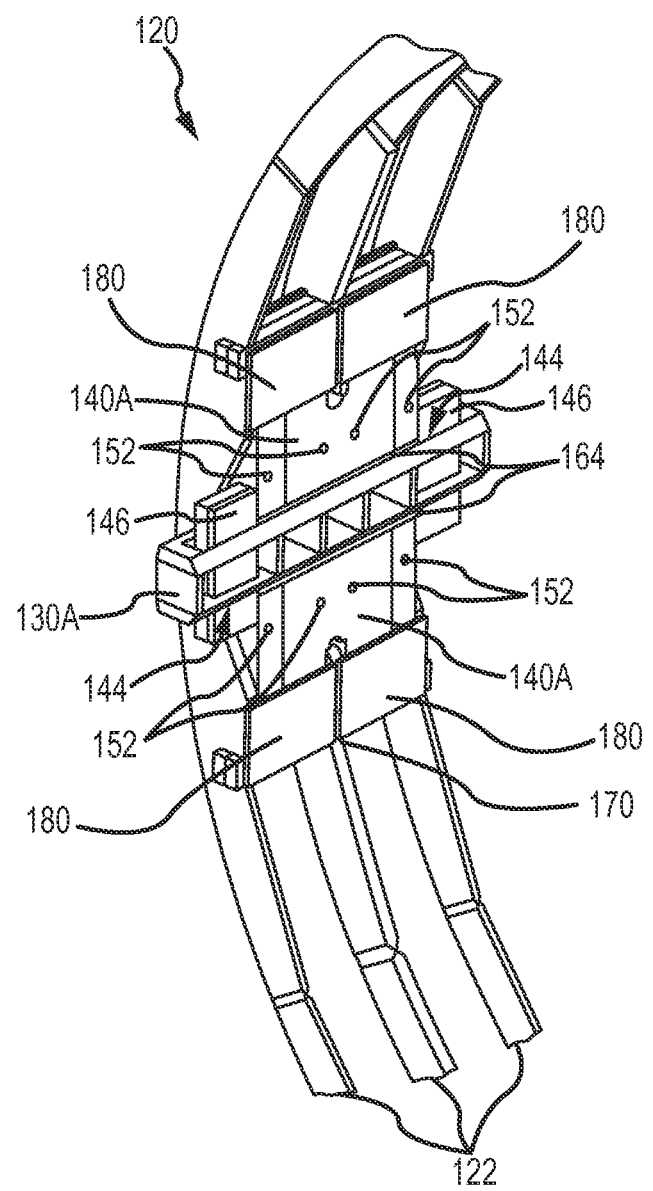
FIG. 9 is a perspective view of a portion of one embodiment of a cryogenic tank support assembly with a fixed top keyway.
Figure 10:
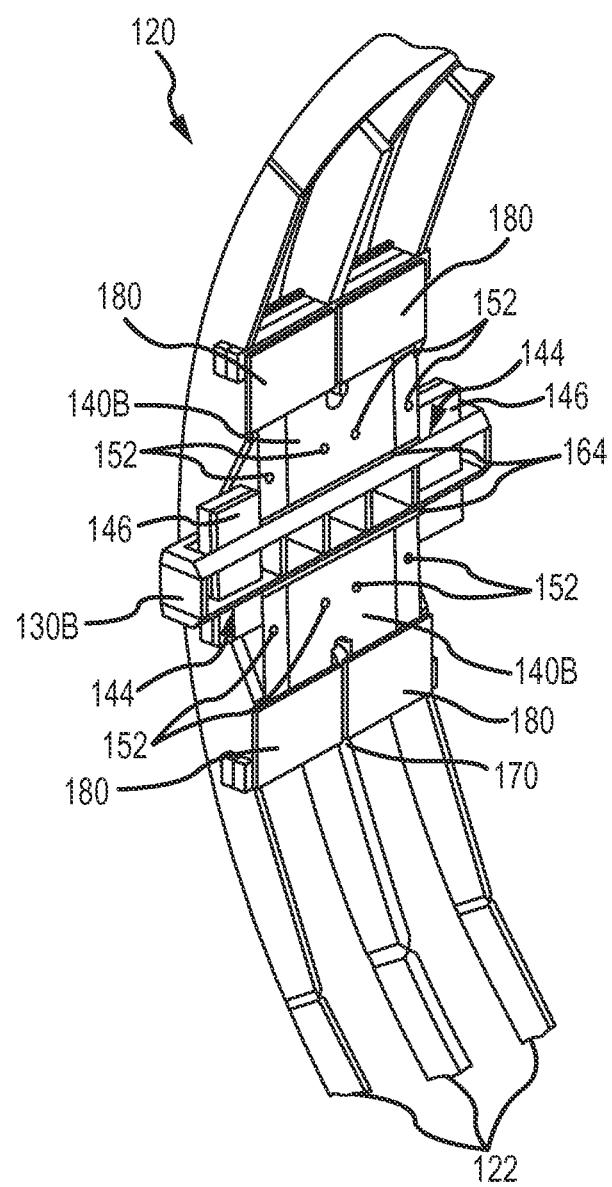
FIG. 10 is a perspective view of a portion of one embodiment of a cryogenic tank support assembly with a fixed bottom keyway.
Figure 11:
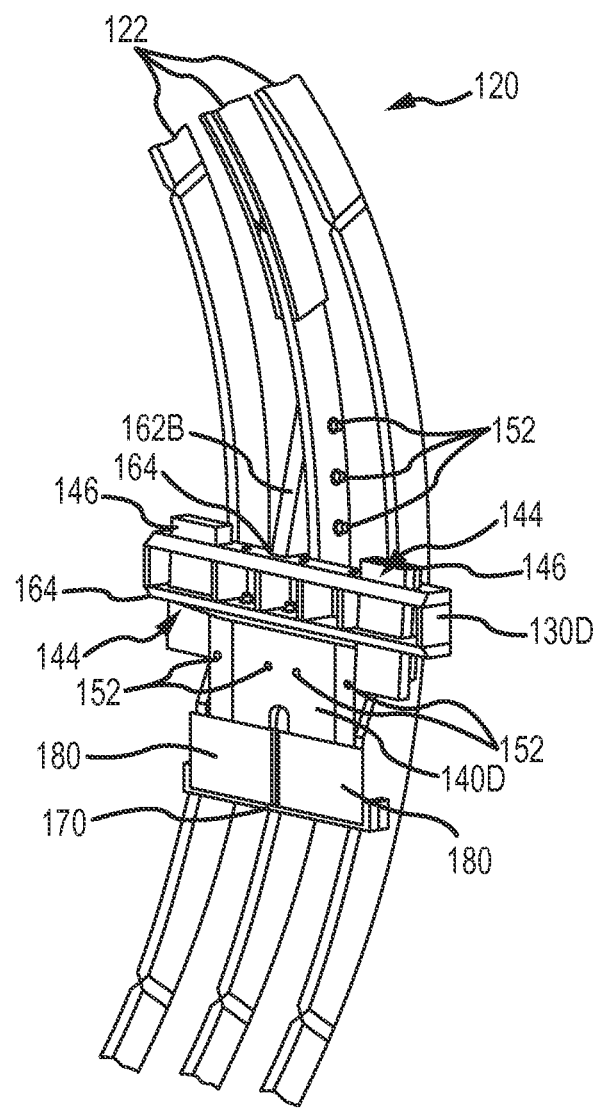
FIG. 11 is a perspective view of a portion of one embodiment of a cryogenic tank support assembly with a fixed left side keyway.
Figure 12:
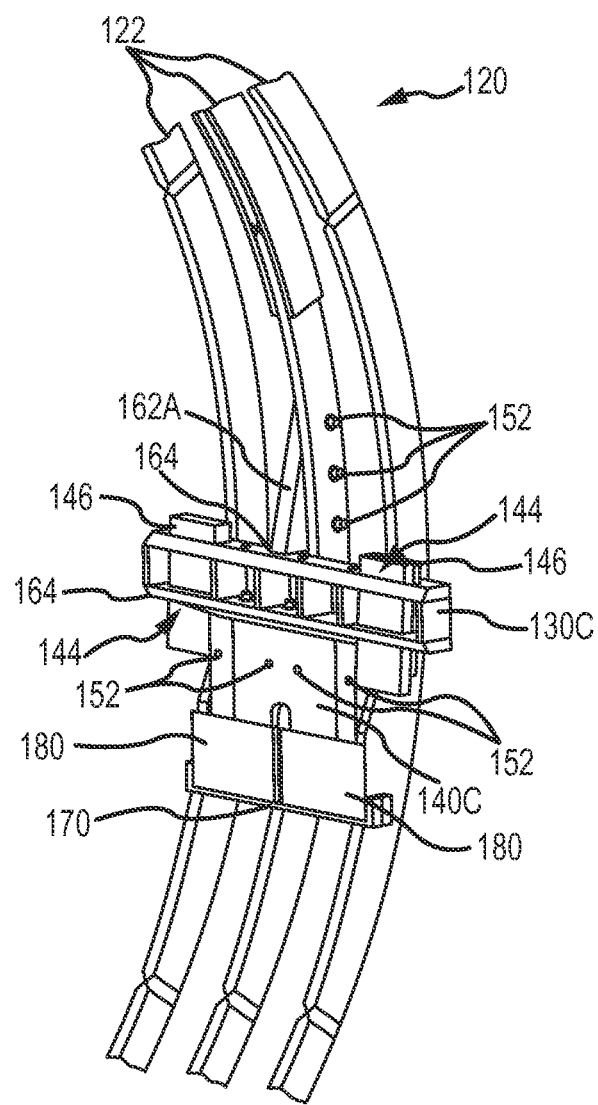
FIG. 12 is a perspective view of a portion of one embodiment of a cryogenic tank support assembly with a fixed right side keyway.

As shown in FIGS. 4, 7 and 8, the keyways that receive the two side keys 130C, 130D may be provided by affixing rectangular key blocks 140C, 140D and rollover braces 162A, 162B to the inner side of the of the outer tank structure 120. In one arrangement, the key blocks 140C, 140D and rollover braces 162A, 162B may be at least partially positioned within at least one gap 123 between adjacent circumferential rib members 122. For instance, the key blocks 140C, 140D may be at least partially positioned within adjacent gaps 123. One rectangular key block 140C and one rollover brace 162A may be affixed to the inner side of the outer tank structure 120 with a gap between an edge of the rectangular key block 140C and an end of the rollover brace 162A defining the side keyway at the three o'clock position for receiving side key 130C, and the other rectangular key block 140D and rollover brace 162B may be affixed to the inner side of the outer tank structure 120 with a gap between an edge of the rectangular key block 140D and an end of the rollover brace 162B defining the side keyway at the nine o'clock position for receiving side key 130D. Each rectangular key block 140C, 140D may be affixed to the inner side of the outer tank structure 120 with one or more bolts 152 secured with nuts 154 to one or more thermal spacers 156 provided on the inner side of the outer tank structure 120. Each rollover brace 162A, 162B may be affixed to the inner side of the outer tank structure 120 with one or more bolts 152 secured with nuts 154 to a circumferential rib member 122 of the outer tank structure 120.

The gaps provided between the edges of the pairs of rectangular key blocks 140A, 140B and between the edges of rectangular key blocks 140C, 140D and the ends of the rollover braces 162A, 162B are sized to permit insertion of the respective top and bottom keys 130A, 130B and the left and right side keys 130C, 130D in their respective keyways. For example, the gap between the edges of the pairs of rectangular key blocks 140A, 140B may be slightly wider than the width of the top and bottom keys 130A, 130B, and the gap between the edges of the rectangular key blocks 160A, 160B and the ends of the rollover braces 162A, 162B may be slightly wider than the width of the side keys 130C, 130D. In this regard, one or more shims 164 may be inserted within the keyways against the sides of the keys 140A-140D to limit side-to-side movement of the keys 140A-140D within the keyways.

As illustrated in FIGS. 5-8, each respective key 130A-130D may be configured such that longitudinal movement of the key 130A-130D within its respective keyway relative to the respective key blocks 140A-140D is permitted. Such key 130A-130D and key block 140A-140D combinations may be referred to herein as a sliding top, bottom or side keyways. However, it is also possible that one or more of the keys 130A-130D may be configured such that longitudinal movement of a key 130A-130D within its respective keyway relative to the respective key blocks 140A-140D is restricted. One manner of doing so is depicted in FIGS. 9-12. In this regard, a key 130A-130D may be provided with a length such that it projects longitudinally forward and rearward of the key blocks 140A-140D defining its respective keyway. Slots 144 may be provided in the projecting ends of the key 130A-130D. Each slot 144 is configured for receiving a shear pin 146 therethrough. The shear pins 146 contact edges of the key blocks 140A-140D to restrict longitudinal sliding of the keys 130A-130D within the keyways. In this regard, each of the rectangular key blocks 140A-140D may be constructed of several sections (e.g., three sections as shown) of thermally insulating material (e.g., a fiberglass epoxy such as G10CR). The sections may be oriented in different directions in order to optimize the structural properties of the sections resulting from orientations of the glass strands within the blocks 140A-140D.

To improve the insulating efficiency of the cryogenic tank assembly 100, insulation 170 may applied to fill voids adjacent to the key blocks 140A-140D support locations. In this regard, one example of an appropriate insulating material is Cryo-Lite® cryogenic insulation available from Johns Manville.

Figure 13:
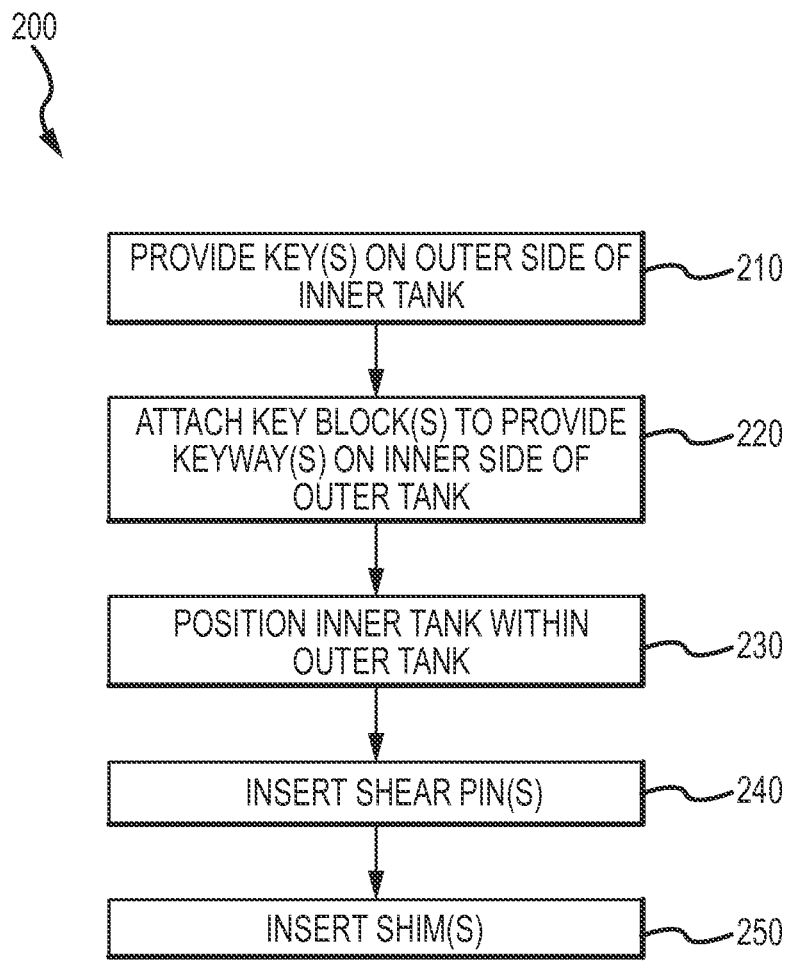
FIG. 13 shows one embodiment of a method of supporting a cryogenic storage tank in a thermally isolated manner.

FIG. 13 shows the steps that may be included in one embodiment of a method 200 of supporting a cryogenic storage tank in a thermally isolated manner. In step 210 of the method 200, one or more keys are provided on an outer side of an inner tank structure. The keys may, for example, be provided by welding metal pieces having a greater length than width to the outside of the inner tank structure 110. The inner tank structure provides a cryogenic substance storage volume within which a cryogenic substance may be stored.

In step 220 of the method 200, one or more of keyways for receiving the keys are provided. One or more of the keyways may, for example, be provided by attaching a pair of rectangular blocks of thermally insulating material (e.g., a fiberglass epoxy such as G10CR) to an inside of the outer tank structure such that there is a longitudinally extending gap between adjacent edges of the blocks such as depicted and described in connection with the top and bottom keyways shown in FIGS. 3, 5, 6, 9 and 10. One or more of the keyways may, for example, be provided by attaching a rectangular block and a rollover brace both of thermally insulating material (e.g., a fiberglass epoxy such as G10CR) to an inside of the outer tank structure such that there is a gap between an edge of the block and an end of the rollover brace such as depicted and described in connection with the side keyways shown in FIGS. 4, 7, 8, 11 and 12. In one embodiment of the method 200, keyways may be provided at four radial locations (e.g., three o'clock, six o'clock, nine o'clock and twelve o'clock locations).

In step 230 of the method 200, the inner tank structure having the key(s) provided thereon is positioned within the outer tank structure. In this regard, the inner and outer tank structures may, for example, both be cylindrically shaped with the outer tank structure have a larger diameter than the inner tank structure. In other embodiments the inner and outer tank structures may be shaped differently, as long as the inner tank structure fits within the outer tank structure. Each key is configured so that when the inner tank structure is positioned in the outer tank structure, the key is captured in its corresponding keyway and supports the inner tank structure in a spaced relation with the outer tank structure. In this regard, the thermally insulating key block(s) defining the keyway(s) keep the inner tank structure from directly contacting the outer tank structure.

In step 240 of the method 200, one or more shear pins may be inserted through slots formed in one or more of the keys to hold the key(s) in a fixed position within their corresponding keyway. Step 240 may not be necessary where longitudinal movement of a particular key within its corresponding keyway is acceptable.

In step 250 of the method 200, one or more shims may be inserted between a surface of each key and the key block(s) defining the keyway in which the key has been inserted. Step 250 may not be necessary in instances where a particular key fits tightly within its corresponding keyway.

Deviations may be made from the specific embodiments disclosed in the specification without departing from the spirit and scope of the invention. While this disclosure contains many specifics, these should not be construed as limitations on the scope of the disclosure or of what may be claimed, but rather as descriptions of features specific to particular embodiments of the disclosure. Certain features that are described in this specification in the context of separate embodiments and/or arrangements can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Additionally, the foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A cryogenic tank support assembly comprising:
   an outer tank structure defined by a plurality of circumferential rib members that are disposed adjacent to one another with a gap between adjacent ones of the circumferential rib members;
   an inner tank structure having a storage volume therein for storing a cryogenic material;
   at least one key on an outer side of said inner tank structure; and
   at least one key block comprised of a thermally insulating material that is affixed to an inner side of said outer tank structure and at least partially positioned within the gap between adjacent ones of the circumferential rib members to define at least one keyway in which said at least one key is received, said at least one key block contacting said at least one key to support said inner tank structure in a spaced relation with said outer tank structure such that said inner tank structure does not directly contact said outer tank structure.

2. The assembly of claim 1, further including:
   at least one plate extending between the adjacent ones of the circumferential rib members and defining at least one pocket into which the key block extends.

3. The assembly of claim 2, wherein said pocket is positioned within said gap.

4. The assembly of claim 1 further comprising:
   a plurality of keys on the outer side of said inner tank structure; and
   a plurality of key blocks comprised of a thermally insulating material and affixed to an inner side of said outer tank structure to define a plurality of keyways with each said key being received in a corresponding one of said keyways, said plurality of key blocks contacting said keys to support said inner tank structure in a spaced relation with said outer tank structure such that said inner tank structure does not directly contact said outer tank structure.

5. The assembly of claim 4 wherein each said keyway comprises one of:
   a longitudinally extending gap between adjacent edges of a pair of rectangular key blocks attached to an inside of said outer tank structure; and
   a gap between an edge of a rectangular key block attached to an inside of said outer tank structure and an end of a rollover brace attached to an inside of said outer tank structure.

6. The assembly of claim 4 wherein said plurality of keyways comprises four keyways and wherein said plurality of keys comprises four keys.

7. The assembly of claim 6 wherein said keys are located at four separate radial locations around said inner tank structure.

8. The assembly of claim 1, wherein said at least one key and said at least one key block provide the only points of contact between the inner and outer tank structures.

9. The assembly of claim 1, wherein said at least one keyway includes first and second opposite ends, wherein said at least one key includes first and second opposite projecting ends that respectively project past the first and second opposite ends of the at least one keyway, wherein each of the first and second projecting ends includes at least one slot therein, and wherein the assembly further comprises:
   at least one shear pin received within each slot and configured to contact an edge of said at least one key block to restrict sliding of said at least one key within said at least one keyway.

10. The assembly of claim 1 further comprising:
    at least one shim inserted between a surface of said at least one key and said at least one key block defining said at least one keyway.

11. A method of supporting a cryogenic storage tank in a thermally isolated manner, said method comprising:
    providing at least one key on an outer side of an inner tank structure having a storage volume therein for storing a cryogenic material;
    providing at least one keyway on an inner side of an outer tank structure, the keyway being comprised of a thermally insulating material affixed to the inner side of the outer tank structure, wherein the keyway includes first and second opposite ends, wherein the key includes first and second opposite projecting ends that respectively project past the first and second opposite ends of the keyway, and wherein each of the first and second projecting ends includes at least one slot therein;
    positioning the inner tank structure within the outer tank structure with the at least one key being received in the at least one keyway such that the thermally insulating material of the at least one keyway contacts the at least one key to support the inner tank structure in a spaced relation with the outer tank structure wherein the inner tank structure does not directly contact the outer tank structure; and
    inserting at least one shear pin into each slot to hold the key in a fixed position within the keyway.

12. The method of claim 11 wherein said thermally insulating material comprises a fiberglass epoxy material.

13. The method of claim 11 further comprising:
    providing a plurality of keys on an outer side of an inner tank structure;

providing a plurality of keyways comprised of a thermally insulating material affixed to the inner side of said outer tank structure; and positioning the inner tank structure within the outer tank structure with each said key being received in a corresponding one of the keyways such that the thermally insulating material of the keyways contact the keys to support the inner tank structure in a spaced relation with the outer tank structure wherein the inner tank structure does not directly contact the outer tank structure.

14. The method of claim 13 wherein said providing said plurality of keyways comprises:

attaching a pair of rectangular blocks of thermally insulating material to an inside of said outer tank structure such that there is a longitudinally extending gap between adjacent edges of said blocks; and attaching a rectangular block of thermally insulating material and a rollover brace of thermally insulating material to an inside of said outer tank structure such that there is a gap between an edge of said block and an end of said brace.

15. The method of claim 13 wherein said plurality of keyways comprises four keyways and wherein said plurality of keys comprises four keys.

16. The method of claim 15 wherein said keys are located at four separate radial locations around said inner tank structure.

17. The method of claim 16 wherein said radial locations comprise three o'clock, six o'clock, nine o'clock and twelve o'clock locations.

18. The method of claim 11 further comprising:

inserting at least one shim between a surface of said at least one key and said at least one keyway.

\* \* \* \* \*